2 Sheets—Sheet 1.

G. C. TEWKSBURY,

Assignor to TEWKSBURY AUTOMATIC ELEVATOR COMPANY.

ELEVATOR.

No. 10,191. Reissued Aug. 29, 1882.

Attest:
Walter D. Caldwell
David H. Mead

Inventor:
Geo. C. Tewksbury
by Eli Spear
Att'y.

N. PETERS, Photo-Lithographer, Washington, D. C.

G. C. TEWKSBURY,

Assignor to TEWKSBURY AUTOMATIC ELEVATOR COMPANY.

ELEVATOR.

No. 10,191. Reissued Aug. 29, 1882.

Attest:
Walter Thualson
David H. Mead

Inventor
Geo. C. Tewksbury
by Ellis Spear
Atty.

N. PETERS, Photo-Lithographer, Washington, D. C.

UNITED STATES PATENT OFFICE.

GEORGE C. TEWKSBURY, OF NEWARK, ASSIGNOR TO TEWKSBURY AUTOMATIC ELEVATOR COMPANY, OF NEW JERSEY.

ELEVATOR.

SPECIFICATION forming part of Reissued Letters Patent No. 10,191, dated August 29, 1882.

Original No. 255,049, dated March 14, 1882. Application for reissue filed August 3, 1882.

*To all whom it may concern:*

Be it known that I, GEORGE C. TEWKSBURY, of Newark, county of Essex, State of New Jersey, have invented certain new and useful Improvements in Elevators; and I do hereby declare that the following is a full, clear, and exact description of the same.

This invention relates to elevators, and is an improvement upon the device shown in Letters Patent granted to me on the 14th day of March, 1882, No. 255,050; and the objects of my improvements are, first, to provide a more positive and efficient means than heretofore known for taking up the momentum of the driving-shaft, thereby rendering the elevator more sensitive and obedient to the shipper; second, to afford facilities for revolving the shipper-rod so as to bring any one of the stopping devices which are arranged upon said rod into a given vertical plane; third, to provide a more positive indicator than heretofore known for determining the position of the locking devices at the point where the elevator is intended to stop; and, fourth, to provide facilities for preventing the cramping or breaking of the locking devices in case the elevator should not properly or readily respond to the belt-shipping devices. All of these are hereinafter fully described and specifically claimed.

Figure 1:
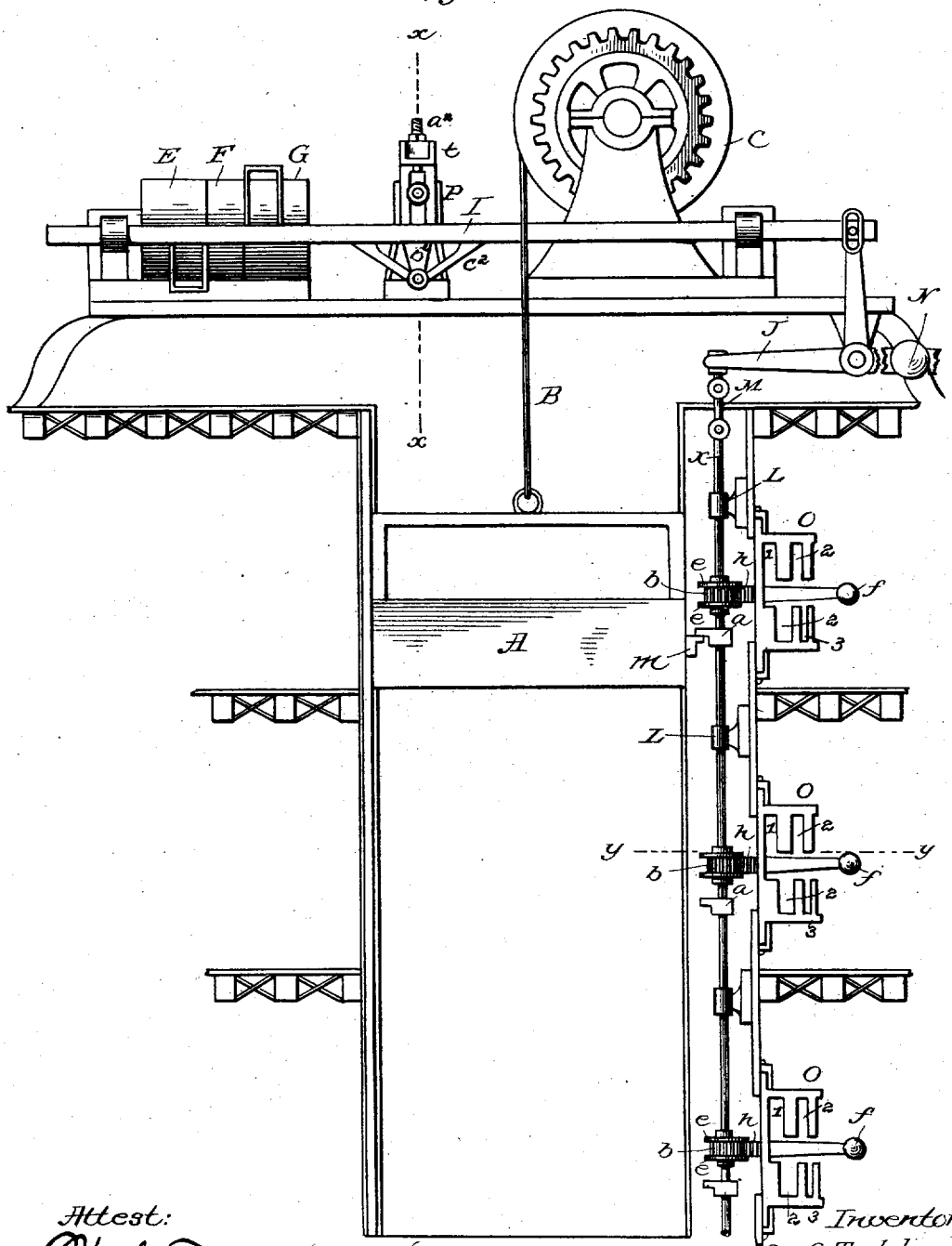
Figure 2:
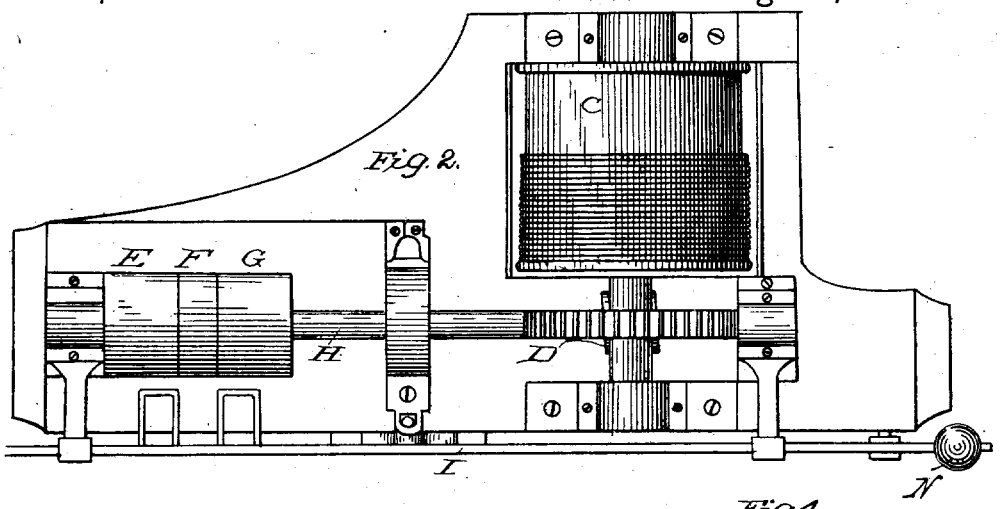
Figure 3:
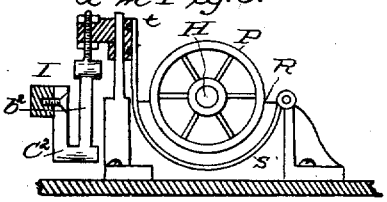
Figure 4:
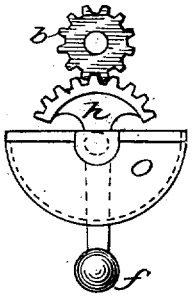
Figure 5:
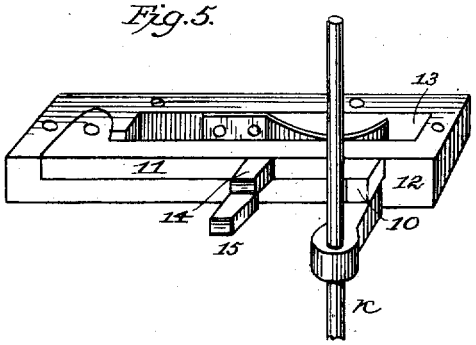
Figure 6:
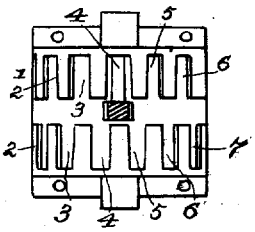

In the accompanying drawings, Figure 1 is a side elevation of the entire machine, representing the same in contact with the building. Fig. 2 is a plan of the hoisting mechanism. Fig. 3 is a cross-section on line *x x*, Fig. 1. Fig. 4 is a cross-section on line *y y*, Fig. 1. Fig. 5 is a detached view of the locking mechanism. Fig. 6 is a detached view of the indicator.

The elevator-box A, cord B, drum C, worm D, pulleys E F G, shaft H, and shipping-levers I J are all constructed and combined as shown, to operate in the usual manner.

Connected with the elbow-lever J is a vertically-reciprocating rod, K, which extends the entire length of the elevator-well. It slides in suitable bearings, L, secured to the wall of the building, and is swiveled to the lever J, so as to admit the rotary movement referred to hereinafter. Said rod, to avoid bending, is provided with a link, M, which is set in the upper end thereof. The weight of the rod is balanced by a counter-weight, N, attached to a projection from the lever J, as shown. The rod is also provided with pins *a*, which are fixed at different places on the rod, and project therefrom in different directions, like so many radii of a circle. Said rod is further provided with small gear-wheels *b*, which are fixed thereon between suitable disks, *e*, as shown in Fig. 1. By moving this rod upward or downward the driving-belts may be shifted about on the pulleys E F G, as and whenever occasion requires it, to start or stop the elevator. This movement of the rod K is effected by means of the handles *f*, which project outward through suitable slots in the indicators O. The construction of the rod, its connection with the levers, and shifting device for stopping or for changing directions are the same as that described in my aforesaid patent. The construction of the handles and their connection with the rod are, however, different. Said handles are fulcrumed on the center pins of the indicators, as shown in Fig. 4, being allowed to slide vertically as well as to oscillate thereon. Each handle carries upon one end a segmental gear, *h*, which meshes into the corresponding smaller gear-wheel, *b*, between the disks *e*, as shown in Fig. 1. With this construction it is possible, by a horizontal movement of the handle *f*, to effect a partial or a complete revolution of the rod K, so as to bring any one of the pins *a*, set at any point upon the rod, into the same vertical straight line with the dog *m*, which is attached to the elevator-box A, as referred to hereinafter.

Each of the indicators O consists of a semi-cylindrical case having a central horizontal slot, which communicates directly with other vertical slots made and numbered as shown in Fig. 6. Said vertical slots are constructed in two rows—one above and the other below the horizontal slot—to correspond with the two directions in which it is possible to move the shipping-rod K. Each of said rows is provided with as many slots, less one, as there are stories in the building which contains the elevator, and the slots on one side alternate with those on the other, as shown, for purposes referred to hereinafter.

The elevator-box is always at rest so long as the driving-belts remain on the loose or end pulleys, E G, which is always the case while the handles *f* are in the horizontal slots of the indicators O. The elevator-box is set in motion by shifting either of the driving-belts onto the tight pulley F. This may be done by simply pushing the handle up or down (the direction being always contrary to that in which the elevator is intended to move) in either of the vertical slots, thereby moving the rod K, as before described.

The pins *a* are fixed upon the rod K, so that when any one of the same is in a perpendicular line with the dog *m*, Fig. 1, the handles *f* will be at those slots of the indicators, respectively, which correspond in number with the story of the building at which the pin so arranged is located.

It must now be evident that when the operator desires to ship the elevator-box and have it stop at a given point or floor of the building he has only to turn the handle *f* into line with that slot of the indicator whose number corresponds with the number of the given floor, and whose position is on that side of the horizontal slot opposite to the direction which the elevator is to travel in order to reach said floor, and then push the handle up or down, as occasion requires, in the slot. Movement of the rod K will then shift the proper belt upon the tight pulley and the elevator-box will thereupon begin to move toward said point, and will continue so to move till the dog *m*, (which is fixed upon the box A,) interlocking with the pin *a*, (which is set upon the rod K at the given point,) moves the rod sufficiently to bring the handle *f* back to the horizontal slot, at which moment the elevator rests, as aforesaid. The belts are prevented from being carried over so as to ship the elevator in the opposite direction by reasons of the handles *f* coming in contact with the projecting teeth of the indicators O; hence the alternating arrangement of the vertical slots.

The dog *m* will be equally effective for stopping the elevator, though rigidly fastened to the box A, as shown in Fig. 1; but I prefer (as a means of preventing breakage in case the elevator should not quickly respond to the shipping devices) to construct and arrange the dog, as shown in Fig. 5. I therefore proceed to describe the same, so that others may construct and make use thereof. In this arrangement said dog is formed as a tongue, 10, projecting from the lever 11. Said lever is arranged, as shown, in a mortise formed in the block 12. Behind the lever 11 is a spring, 13, which serves to push forward the lever, so as to keep the tongue 10 projecting outward, as shown. Said lever is further provided with a second tongue, 14, which operates upon a pin, 15, as referred to hereinafter.

In operation the block 12 is secured to the side of the elevator-box A, the tongues being allowed to project beyond the edge of the box. The pin 15 is secured to the wall of the building in close proximity to the pin *a* and in a perpendicular line with the tongue 14. The elevator may then be set in motion, as above described. The tongue 10 will engage with the pins *a* and reciprocate the shipper-rod K, so as to bring the handles *f* into the horizontal slots of the indicator O. At this moment the tongue 14 strikes upon the pin 15, (secured to the building, as before described,) which depresses the lever 11, so as to draw the tongue 10 inward away from the pin *a* and allow the elevator to pass.

To make sure of the elevator stopping promptly at the given point, I have devised a mechanism to be used in combination with the driving mechanism for taking up the momentum thereof, as follows: Upon the driving-shaft H is a fixed pulley, P, Fig. 3, about which is arranged the brake-shoe R. Said shoe is held in position by a spring, S, one end of which is attached to the hanger *r*, and the other end of which is attached to the movable block *t*, as shown. Said block *t* is arranged to slide upon the vertical hanging pin *m'*. It carries the screw-rod $a^2$, to which is joined one end of the toggle-arm $b^2$, Figs. 1 and 3, the other end of which is jointed, as shown, to the angular frame $c^2$, which in turn is fixed to horizontal lever I, as shown. With this arrangement it must be evident that when the lever I, Fig. 1, is moved in either direction horizontally, as it must be in order to bring either of the driving-belts onto the tight pulley F, the effect is to depress the spring S, so as to relieve the pressure of the shoe against the pulley P and allow the elevator to freely move, while the reverse of this movement, which always takes place in stopping the elevator when the dog has moved the rod, elevates the end of the spring and brings the shoe in contact with the pulley P, so as to counteract the momentum thereof, and insures the stopping of the elevator-box as soon as the rod has been elevated or lowered by contact with the dog.

What I claim is—

1. The combination of the lever J, pivoted as shown, the pulleys E F G and intermediate belt-shifting devices, the revoluble vertically-sliding rod K, having suitable pins, *a*, arranged at different points on the rod to project in different directions therefrom, the handles *f*, fulcrumed as shown, and the intermediate gearing mechanisms, whereby the rod K may be turned and vertically reciprocated, substantially as described.

2. The combination of the lever J, pivoted as shown, the pulleys E F G and intermediate belt-shifting devices, the revoluble vertically-sliding rod K, having pins *a*, arranged at different points on the rod to project therefrom in different directions, substantially as described, the lever-handles *f*, fulcrumed as shown, the indicators O, for determining the relative position of the pins *a*, and the intermediate gearing mechanism, whereby the rod K may be turned, substantially as described.

3. In an elevator of substantially the construction described, the combination of the revoluble vertically-reciprocating rod K, provided with pins *a*, gear-wheels *b*, and suitable disks, *e*, said pins, gears, and disks being arranged upon the rod at different points, with the pins *a* projecting therefrom in different directions, substantially as described, the centrally-pivoted lever-handles *f*, having segmental gears on one end to mesh with the gears on the rod, and suitable indicating mechanism for locating the relative position of the pins *a*, substantially as described.

4. The combination, substantially as described, of the elevator-box A, the detachable block 12, the lever pivoted to the detachable block and provided with projecting tongues, as shown, and mechanism for pushing forward the lever, so as to keep the tongues in position, substantially as described.

5. The combination, with the movable lever on the elevator-box, of the stud-pins 15, attached to the wall of the building, adapted to automatically engage with the tongue 14 on the lever when the box is reciprocated, so as to throw the tongue 10 on the lever out of engagement with the clutch on the rod K, substantially as described.

6. The within-described indicator O, which consists of a semi-cylindrical case having two systems of vertical slots, one on each side of a central horizontal opening, with the vertical slots on one side communicating with the horizontal opening alternately with the vertical slots on the other side thereof, all of said openings being adapted to receive the handle *f*; and the vertical slots being numbered, as shown.

7. In an elevator, a shifting mechanism, whereby the driving mechanism is applied to the elevator-box or disconnected therefrom, a shifting-rod having handles and spline at each point or floor for starting the box in either direction and for setting the pins for any given point or floor, and to be acted on by the box, and a brake mechanism connected to the shifting-rod, whereby the motion of the car automatically disconnects the power and applies the brake at the same time, substantially as described.

GEO. C. TEWKSBURY.

Witnesses:
J. M. BADGER,
J. W. TEWKSBURY.